(12) United States Patent
Song (10) Patent No.: US 8,605,618 B2
(45) Date of Patent: Dec. 10, 2013

(54) METHOD, SYSTEM AND APPARATUS FOR READING BROADCAST MESSAGE

(75) Inventor: Ping Song, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 174 days.

(21) Appl. No.: 13/288,412

(22) Filed: Nov. 3, 2011

(65) Prior Publication Data
US 2012/0051274 A1 Mar. 1, 2012

Related U.S. Application Data (63) Continuation of application No. PCT/CN2009/071649, filed on May 5, 2009.

(51) Int. Cl.
*G01R 31/08* (2006.01)
(52) U.S. Cl.
USPC ............................ 370/252; 370/328; 370/503
(58) Field of Classification Search
None
See application file for complete search history.

(56) References Cited

U.S. PATENT DOCUMENTS

| | | | |
|---|---|---|---|
| 8,200,228 B2 * | 6/2012 | Peisa et al. ............... | 455/438 |
| 2006/0258383 A1 | 11/2006 | Jiang et al. | |
| 2008/0064397 A1 * | 3/2008 | Park et al. ............... | 455/434 |
| 2008/0080472 A1 * | 4/2008 | Bertrand et al. ........ | 370/344 |
| 2009/0054055 A1 | 2/2009 | Iwamura et al. | |

FOREIGN PATENT DOCUMENTS

| | | |
|---|---|---|
| CN | 1549612 A | 11/2004 |
| CN | 1857021 A | 11/2006 |
| CN | 101365223 | 2/2009 |
| EP | 1671508 B1 | 8/2004 |
| JP | 2007/202096 A | 8/2007 |
| WO | WO2005032190 A1 | 4/2005 |
| WO | WO2009014248 A1 | 1/2009 |

OTHER PUBLICATIONS

Notice of Reason for Rejection received in Japanese Application No. 2012-508878, mailed Feb. 19, 2013, 6 pages.
Written Opinion of the International Searching Authority (translation) dated (mailed) Feb. 25, 2010, issued in related Application No. PCT/CN2009/071649, filed May 5, 2009, Huawei Technologies Co., Ltd.
International Search Report for International Application No. PCT/CN2009/071649, mailed Feb. 25, 2010 Huawei Technologies Co., LTD.

(Continued)

*Primary Examiner* — Duc C Ho
(74) *Attorney, Agent, or Firm* — Slater & Matsil, L.L.P.

(57) ABSTRACT

The present invention discloses a method, a system, and an apparatus for reading a broadcast message, which relates to the field of mobile communications, and is designed for quickly reading a broadcast message of an unknown neighboring cell. A method for reading a broadcast message includes: receiving, by a network side device, measurement information reported by a user equipment (UE); if according to the measurement information, it is determined that the UE discovers an unknown neighboring cell, performing a scheduling synchronization negotiation for uplink resources and downlink resources of the UE; and after the scheduling synchronization negotiation for the uplink resources and the downlink resources of the UE reaches an agreement, instructing the UE to read a broadcast message of the unknown neighboring cell. The present invention is used for quickly reading a broadcast message of an intra-system or inter-system unknown neighboring cell.

17 Claims, 8 Drawing Sheets

(56) References Cited

OTHER PUBLICATIONS

3GPP TS 36.331 V8.2.0, 3$^{rd}$Generation Partnership project; Technical Specification Group Radio Access Network; Evolved Universal Terrestrial Radio Access (E-UTRA) Radio Resource Control (RRC); Protocol specification (Release 8), May 2008.

3GPP TS 36.300 V8.4.0, 3$^{rd}$Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) Mar. 2008.

3GPP TSG RAN WGS Meeting #57bis (R3-071819); Oct. 8-11, 2007, Sophia Antipolis, France; Source: Ericsson; Title: On Automatic Neighbour Relation Configuration; Agenda Item: 7.2.2a; Document fo: Discussion and Decision (3 pgs.).

3GPP TSG-RAN WG3 Meeting #59 (R3-080420); Feb. 11-15, 2008; Sorrento, Italy; Agenda item: 10.1.1a; Source: Ericsson; Title: Inter-RAT/Frequency Automatic Neighbor Relation Measurements; Document for: Approval (8 pgs.).

3GPP TSG-RAN WG2 Meeting #61bis (R2-081730); Mar. 31-Apr. 4, 2008; Agenda item: 4.9.1; Source: Nokia Corporation, Nokia Siemens Networks; Title SON Automatic Neighbour Relation Function; Document for: Discussion and Decision (6 pgs.).

European Patent Office Communication pursuant to Rule 62 EPC, the supplementary European search report (Art. 153(7) EPC) and the European search opinion related to Application No. 09844233.8-2414; mailed Feb. 13, 2012, Huawei Technologies Co., Ltd. (8 pgs.).

Patent Examination Report No. 1 received in Australian Patnet Application No. 2009345733, mailed May 16, 2013, 3 pages.

First Chinese Office Action of Chinese Application No. 200980122143.7 mailed Jul. 2, 2013, 12 pages.

Chinese Search Report for Application No. 2009801221437 mailed Jun. 14, 2013, 2 pages.

Japanese Office Action for Application No. 2012-508878 mailed Jun. 25, 2013, 8 pages.

* cited by examiner

METHOD, SYSTEM AND APPARATUS FOR READING BROADCAST MESSAGE

CROSS-REFERENCE TO RELATED APPLICATIONS

This application is a continuation of International Application No. PCT/CN2009/071649, filed on May 5, 2009, which is hereby incorporated by reference in its entireties.

FIELD OF THE INVENTION

The present invention relates to the field of mobile communications, and in particular, to a method, a system, and an apparatus for reading a broadcast message.

BACKGROUND OF THE INVENTION

The Long Term Evolution (LTE) project is an evolution of $3^{rd}$ generation (3G) mobile communications, which improves and enhances the 3G radio access technologies and applies the orthogonal frequency division multiplexing (OFDM) technology and the multiple-input multiple-output (MIMO) technology. An LTE system is capable of providing a peak rate of 100 Mbit/s for downlink transmission and 50 Mbit/s for uplink transmission under a spectral bandwidth of 20 MHz, thus improving the performance of user equipments (UEs) at cell edges, increasing the cell capacity, and decreasing the system delay.

The cell relation is always a focus in radio network system planning and optimization, and mainly includes two major categories: (a) neighbor relation; and (b) non-neighbor relation (abnormal neighbor relation under cross coverage and normal non-neighbor relation).

Earlier neighbor relations are more often established as follows. On the basis of principles for establishing neighbor relations, a neighbor relation list is set on a radio network controller (RNC) in advance, and then the RNC delivers neighbor information to a UE by delivering a measurement control message to perform a customized neighbor quality detection to facilitate a handover decision.

Unlike neighbor planning methods of earlier systems such as Wideband Code Division Multiple Access (WCDMA), an automatic neighbor relation (ANR) function in an LTE self-organizing network realizes establishment and maintenance of an ANR. The function focuses more on automatic detection of a cell and reporting to an evolved NodeB (eNB) by a UE, as well as detection, creation, and deletion of the neighbor relation by the eNB, thereby avoiding wrong addition of a neighbor due to such possible issues as pilot leakage when the eNB adds a neighbor relation, so that the decision on the quality and stability of the system will not be affected.

Currently, the ANR workflow of an LTE self-organizing network is as follows. A UE sends a detected physical cell identity (PCI) of cell B to cell A; if the PCI is unidentifiable, the UE is instructed to read a Public Land Mobile Network (PLMN) list, a global cell identity (GCI, that is, PLMN identity+eNB identity+cell identity), a type approval code (TAC), a resource admission and control (RAC) code, and other broadcast messages corresponding to the PCI; and the UE reads and reports the broadcast messages of cell B. The above flow is applicable to the reading of a broadcast message of an intra-frequency, inter-frequency, or inter-system Currently, the ANR function reads a broadcast message of an unknown neighboring cell (that is, a cell whose PCI is unidentifiable) in two ways: discontinuous reception (DRX) and measurement gap (GAP).

If only the DRX is used, when there is no enough uplink or downlink data source, the UE has more free time to read a broadcast message, and can successfully read a broadcast message (such as a GCI) of an inter-frequency or inter-system. However, when the uplink or downlink data volume is relatively sufficient, the free time for the UE to read a broadcast message decreases, so the probability of successfully reading a broadcast message of an inter-frequency or inter-system cell decreases accordingly.

If only the GAP is used, because only fixed 6 ms in a specified cycle of 40 ms is used for reading a broadcast message of an inter-frequency or inter-system cell, the probability of successfully reading a broadcast message by the UE is relatively low; moreover, the cycles of broadcast messages of different inter-system cells are different; therefore, this way of reading is not compatible with the reading of all inter-system broadcast messages.

Therefore, it is currently a pressing issue in the field of mobile communications how to enable a UE to quickly read a broadcast message of an unknown neighboring cell and report the message to an eNB in order to discover a new neighbor in a timely manner and create a neighbor relation.

SUMMARY OF THE INVENTION

An embodiment of the present invention provides a method for reading a broadcast message. The method includes: receiving, by a network side device, measurement information reported by a UE; if according to the measurement information, it is determined that the UE discovers an unknown neighboring cell, performing a scheduling synchronization negotiation for uplink resources and downlink resources of the UE; and after the scheduling synchronization negotiation for the uplink resources and the downlink resources of the UE reaches an agreement, instructing the UE to read a broadcast message of the unknown neighboring cell.

An embodiment of the present invention further provides a network side device. The network side device includes: a downlink scheduling unit, adapted to schedule downlink resources of a UE; an uplink scheduling unit, adapted to schedule uplink resources of the UE; an ANR processing unit, adapted to receive measurement information reported by the UE, determine, according to the measurement information, whether the UE discovers an unknown neighboring cell, and if the UE discovers an unknown neighboring cell, send a scheduling synchronization request message to the uplink scheduling unit and/or the downlink scheduling unit, and after the uplink scheduling unit and the downlink scheduling unit perform a scheduling synchronization negotiation for the uplink resources and the downlink resources of the UE and reach an agreement, deliver measurement configuration information to the UE to instruct the UE to read a broadcast message of the unknown neighboring cell.

An embodiment of the present invention further provides a system for reading a broadcast message. The system includes: a UE and a network side device as described above, in which the UE is adapted to report measurement information to the network side device and according to an instruction of the network side device, read a broadcast message of the unknown neighboring cell.

In the technical solutions according to the embodiments of the present invention, a scheduling synchronization negotiation is performed with respect to the uplink resources and the downlink resources of the UE to simultaneously limit uplink resource allocation and downlink resource allocation of the UE in a period of time, so that the UE is not interrupted by the uplink and downlink resources as far as possible when reading the broadcast message of the unknown neighboring cell, thereby having more free time to read a system broadcast message. Therefore, the UE is enabled to quickly read the broadcast message of the unknown neighboring cell.

DETAILED DESCRIPTION OF THE EMBODIMENTS

Embodiments of the present invention are described below in detail with reference to the accompanying drawings. The embodiments to be described are only a part rather than all of the embodiments of the present invention. All other embodiments obtained by persons or ordinary skill in the art based on the embodiments of the present invention without creative efforts shall fall within the protection scope of the present invention.

Embodiment 1

Figure 1:
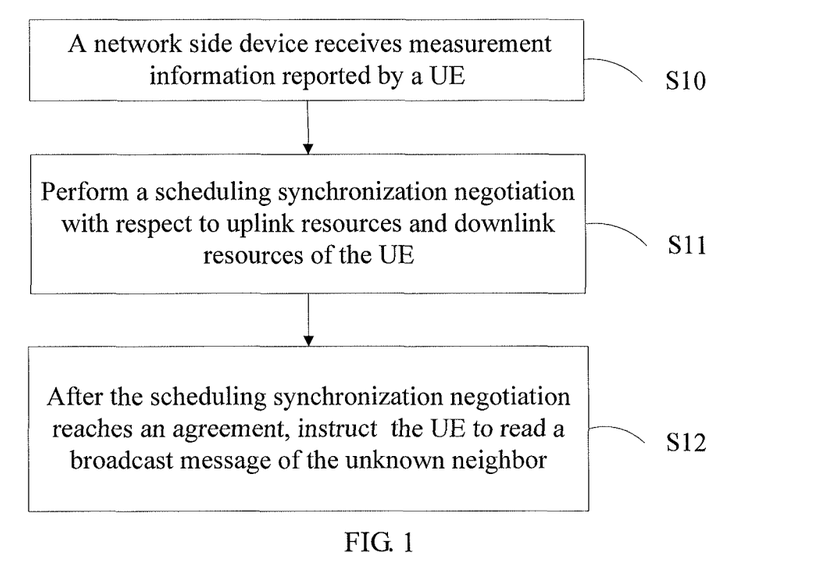
FIG. 1 is a flow chart of a method for reading a broadcast message according to Embodiment 1 of the present invention.

This embodiment provides a method for reading a broadcast message. As shown in FIG. 1, the method includes the following steps.

S10: A network side device receives measurement information reported by a UE.

S11: If according to the measurement information, it is determined that the UE discovers an unknown neighboring cell, perform a scheduling synchronization negotiation for uplink resources and downlink resources of the UE.

S12: After the scheduling synchronization negotiation for the uplink resources and the downlink resources of the UE reaches an agreement, instruct the UE to read a broadcast message of the unknown neighboring cell.

In the method for reading a broadcast message according to this embodiment, a scheduling synchronization negotiation is performed with respect to the uplink resources and the downlink resources of the UE to simultaneously limit uplink resource allocation and downlink resource allocation of the UE in a period of time, so that the UE is not interrupted by the uplink and downlink resources as far as possible when reading the broadcast message of an unknown neighboring cell, thereby having more free time to read a system broadcast message. Therefore, the UE is enabled to quickly read the broadcast message of the unknown neighboring cell.

Embodiment 2

Figure 2:
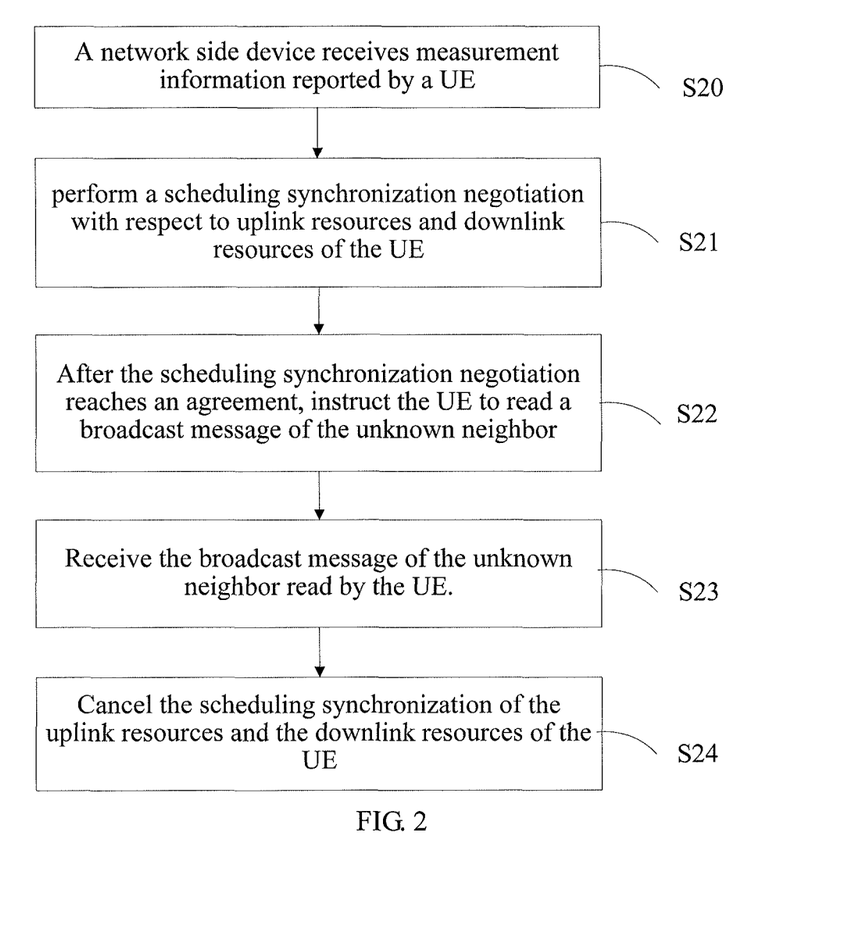
FIG. 2 is a flow chart of a method for reading a broadcast message according to Embodiment 2 of the present invention.

This embodiment provides a method for reading a broadcast message. As shown in FIG. 2, the method includes the following steps.

S20: A network side device receives measurement information reported by a UE.

S21: If according to the measurement information, it is determined that the UE discovers an unknown neighboring cell, the network side device performs a scheduling synchronization negotiation for uplink resources and downlink resources of the UE.

In step S21 above, the scheduling synchronization negotiation for the uplink resources and the downlink resources of the UE may be implemented by many methods. Only three of the methods are enumerated in the following. The network side device in this embodiment includes a downlink scheduling unit, an uplink scheduling unit, and an ANR processing unit. The downlink scheduling unit is adapted to allocate the downlink resources. The uplink scheduling unit is adapted to allocate the uplink resources. The ANR processing unit is adapted to receive the measurement information reported by the UE, determine, according to the measurement information, whether the UE discovers an unknown neighboring cell, and if the UE discovers an unknown neighboring cell, send a scheduling synchronization request message to the uplink scheduling unit and/or the downlink scheduling unit, and after the uplink scheduling unit and the downlink scheduling unit perform a scheduling synchronization negotiation for the uplink resources and the downlink resources of the UE and reach an agreement, deliver measurement configuration information to the UF, to instruct the UE to read a broadcast message of the unknown neighboring cell.

First Method

S110: The downlink scheduling unit receives a scheduling synchronization request message.

S111: The downlink scheduling unit and the uplink scheduling unit perform a scheduling synchronization negotiation for the uplink resources and the downlink resources of the UE.

Specifically, step S111 may include the following steps.

S1110: The downlink scheduling unit sends a scheduling synchronization negotiation message to the uplink scheduling unit.

S1111: According to a class of service of the UE and a length of a DRX cycle, the uplink scheduling unit obtains a maximum time interval at which the UE receives uplink data (that is, a maximum uplink scheduling time window) and a moment when uplink scheduling starts, and feeds back the maximum time interval at which the UE receives the uplink data and the moment when the uplink scheduling starts to the downlink scheduling unit. If DRX has been configured, the original DRX configuration for the length of the DRX cycle may be maintained, or DRX may be reconfigured to change the length of the DRX cycle; and if DRX has not been configured, DRX needs to be configured.

Figure 3:
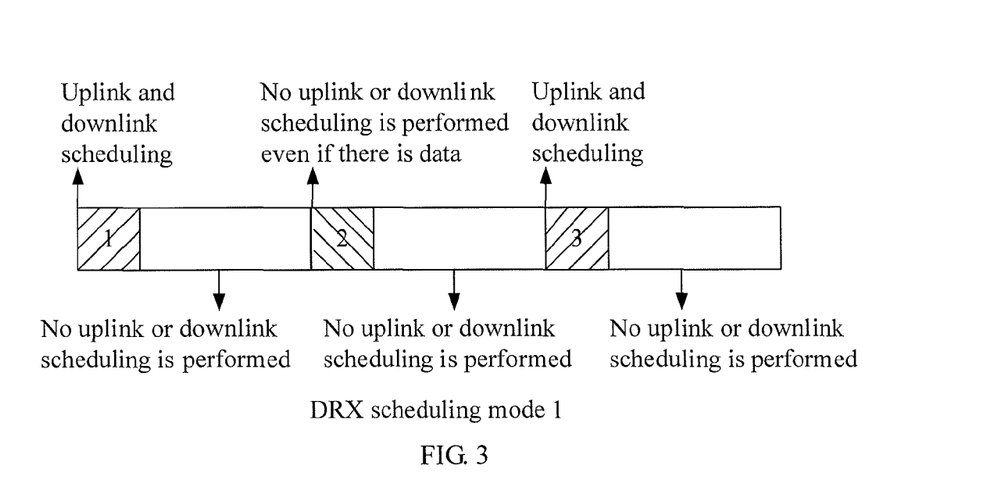
FIG. 3 is a simplified schematic diagram of a first DRX scheduling mode according to an embodiment of the present invention.

As shown in FIG. 3, according to the class of service of the UE and the length of the DRX cycle, the maximum time interval at which the UE receives the uplink data may be one or more DRX cycles, that is, it is possible that no uplink or downlink scheduling is performed for one or more DRX cycles. The DRX cycles in which no uplink or downlink scheduling is performed may be regular or irregular.

Figure 4:
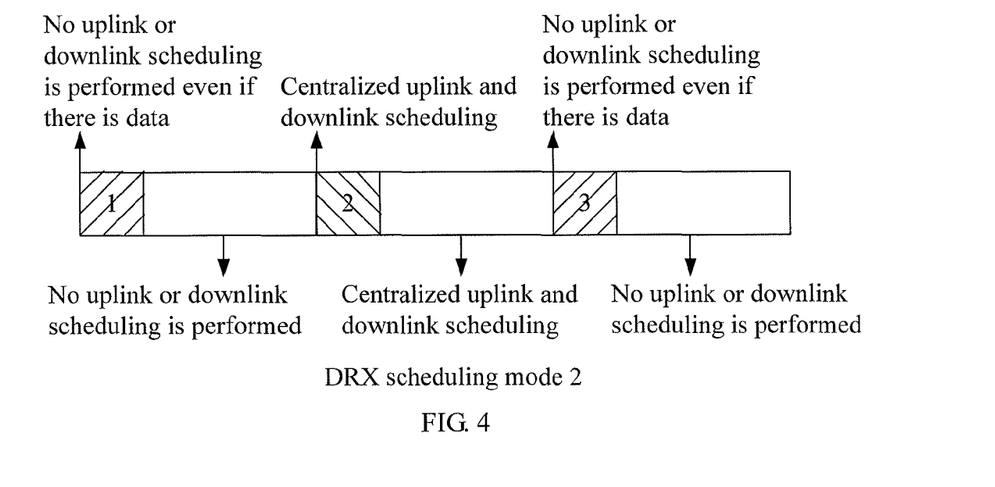
FIG. 4 is a simplified schematic diagram of a second DRX scheduling mode according to an embodiment of the present invention.

In addition, as shown in FIG. 4, according to the class of service of the UE and the length of the DRX cycle, the maximum time interval at which the UE receives the uplink data may be one or more DRX cycles, that is, the uplink and downlink resources may be scheduled in a centralized manner at an interval of one or more DRX cycles. The DRX cycles in which no uplink or downlink scheduling is performed may be regular or irregular. However, unlike FIG. 3, in the DRX cycles in which the uplink and downlink resources are scheduled in a centralized manner, if the centralized scheduling of the uplink and downlink resources is not completed during the active period of DRX, the centralized scheduling of the uplink and downlink resources may be continued during the sleep period of DRX.

S1112: According to the class of service of the UE and the length of the DRX cycle, the downlink scheduling unit obtains a maximum time interval at which the UE receives downlink data (that is, a maximum downlink scheduling time window) and a moment when downlink scheduling starts in synchronization with the moment when the uplink scheduling starts. The method and step for determining the maximum time interval at which the UE receives the downlink data are the same as those in step S1111.

S1113: According to the maximum time interval at which the UE receives the uplink data, the maximum time interval at which the UE receives the downlink data, the moment when the uplink scheduling starts, and the moment when the downlink scheduling starts, the uplink scheduling unit or the downlink scheduling unit or the ANR processing unit of the network side device determines a period of time during which the uplink resource allocation and the downlink resource allocation of the UE are limited simultaneously.

Optionally, step S111 may also specifically include the following steps.

S1110': According to the class of service of the UE and the length of the DRX cycle, the downlink scheduling unit obtains the maximum time interval at which the UE receives the downlink data and the moment when the downlink scheduling starts, and sends the maximum time interval at which the UE receives the downlink data and the moment when the downlink scheduling starts to the uplink scheduling unit to perform a scheduling synchronization negotiation. If DRX has been configured, the original DRX configuration for the length of the DRX cycle may be maintained, or DRX may be reconfigured to change the length of the DRX cycle; and if DRX has not been configured, DRX needs to be configured. The method and step for determining the maximum time interval at which the UE receives the downlink data are the same as those in step S1111.

S1111': According to the class of service of the UE and the length of the DRX cycle, the uplink scheduling unit obtains the maximum time interval at which the UE receives the uplink data and the moment when the uplink scheduling starts in synchronization with the moment when the downlink scheduling starts. The method and step for determining the maximum time interval at which the UE receives the uplink data are the same as those in step S1111.

S1112': According to the maximum time interval at which the UE receives the uplink data, the maximum time interval at which the UE receives the downlink data, the moment when the uplink scheduling starts, and the moment when the downlink scheduling starts, the uplink scheduling unit or the downlink scheduling unit or the ANR processing unit of the network side device determines a period of time during which the uplink resource allocation and the downlink resource allocation of the UE are limited simultaneously.

Second Method

S210: The uplink scheduling unit receives a scheduling synchronization request message.

S211: The uplink scheduling unit and the downlink scheduling unit perform a scheduling synchronization negotiation for the uplink resources and the downlink resources of the UE.

Optionally, step S211 may specifically include the following steps.

S2110: The uplink scheduling unit sends a scheduling synchronization negotiation message to the downlink scheduling unit.

S2111: According to the class of service of the UE and the length of the DRX cycle, the downlink scheduling unit obtains the maximum time interval at which the UE receives the downlink data and the moment when downlink scheduling starts, and feeds back the maximum time interval at which the UE receives the downlink data and the moment when the downlink scheduling starts to the uplink scheduling unit. If DRX has been configured, the original DRX configuration for the length of the DRX cycle may be maintained, or the DRX may be reconfigured to change the length of the DRX cycle; and if the DRX has not been configured, the DRX needs to be configured. The method and step for determining the maximum time interval at which the UE receives the downlink data are the same as those in step S1111.

S2112: According to the class of service of the UE and the length of the DRX cycle, the uplink scheduling unit obtains a maximum time interval at which the UE receives the uplink data and a moment when the uplink scheduling starts in synchronization with the moment when the downlink scheduling starts. The method and step for determining the maximum time interval at which the UE receives the uplink data are the same as those in step S1111.

S2113: According to the maximum time interval at which the UE receives the uplink data, the maximum time interval at which the UE receives the downlink data, the moment when the uplink scheduling starts, and the moment when the downlink scheduling starts, the uplink scheduling unit or the downlink scheduling unit or the ANR processing unit of the network side device determines a period of time during which the uplink resource allocation and the downlink resource allocation of the UE are limited simultaneously.

Optionally, step S211 may also specifically include the following steps.

S2110': According to the class of service of the UE and the length of the DRX cycle, the uplink scheduling unit obtains the maximum time interval at which the UE receives the uplink data and the moment when the uplink scheduling starts, and sends the maximum time interval at which the UE receives the uplink data and the moment when the uplink scheduling starts to the downlink scheduling unit to perform a scheduling synchronization negotiation. If DRX has been configured, the original DRX configuration for the length of the DRX cycle may be maintained, or the DRX may be reconfigured to change the length of the DRX cycle; and if the DRX has not been configured, the DRX needs to be configured. The method and step for determining the maximum time interval at which the UE receives the downlink data are the same as those in step S1111.

S2111': According to the class of service of the UE and the length of the DRX cycle, the downlink scheduling unit obtains the maximum time interval at which the UE receives the downlink data and the moment when the downlink scheduling starts in synchronization with the moment when the uplink scheduling starts. The method and step for determining the maximum time interval at which the UE receives the downlink data are the same as those in step S1111.

S2112': According to the maximum time interval at which the UE receives the uplink data, the maximum time interval at which the UE receives the downlink data, the moment when the uplink scheduling starts, and the moment when the downlink scheduling starts, the uplink scheduling unit or the downlink scheduling unit or the ANR processing unit of the network side device determines a period of time during which the uplink resource allocation and the downlink resource allocation of the UE are limited simultaneously.

Third Method

S310: The uplink scheduling unit and the downlink scheduling unit receive a scheduling synchronization request message.

S311: The uplink scheduling unit and the downlink scheduling unit perform a scheduling synchronization negotiation for the uplink resources and the downlink resources of the UE.

Optionally, step S311 may specifically include the following steps.

S3110: The uplink scheduling unit and the downlink scheduling unit receive a scheduling synchronization request message.

S3111: According to the class of service of the UE and the length of the DRX cycle, the uplink scheduling unit obtains the maximum time interval at which the UE receives the uplink data and the moment when the uplink scheduling starts; and according to the class of service of the UE and the length of the DRX cycle, the downlink scheduling unit obtains the maximum time interval at which the UE receives the downlink data and the moment when the downlink scheduling starts. If DRX has been configured, the original DRX configuration for the length of the DRX cycle may be maintained, or DRX may be reconfigured to change the length of the DRX cycle; and if DRX has not been configured, DRX needs to be configured. The method and step for determining the maximum time interval at which the UE receives the downlink or uplink data are the same as those in step S1111.

S3112: According to the maximum time interval at which the UE receives the downlink data, the maximum time interval at which the UE receives the uplink data, the moment when the uplink scheduling starts, and the moment when the downlink scheduling starts, the uplink scheduling unit or the downlink scheduling unit or the ANR processing unit of the network side device determines the moment when the uplink scheduling starts and the moment when the downlink scheduling starts which are synchronous, and the period of time during which the uplink resource allocation and the downlink resource allocation of the UE are limited simultaneously.

In the above three methods, the moment when the uplink scheduling starts and the moment when the downlink scheduling starts are synchronous, including the circumstance under which the moment when the uplink scheduling starts and the moment when the downlink scheduling starts are the same or as same as possible.

Further, in steps S1113, S1112', S2113, S2112' and S3112, the simultaneously limiting the uplink resource allocation and the downlink resource allocation of the UE specifically includes: stopping allocating uplink resources and downlink resources to the UE during the period of time; or allocating fewer uplink resources and downlink resources to the UE during the period of time. Allocating fewer uplink resources and downlink resources to the UE during the period of time means, provided that the quality of service (QoS) of the UE is met, allocating as few uplink resources and downlink resources as possible to the UE during the period of time.

S22: After the scheduling synchronization negotiation for the uplink resources and the downlink resources of the UE reaches an agreement, the network side device instructs the UE to read a broadcast message of the unknown neighboring cell. The instructing the UE to read a broadcast message of the unknown neighboring cell specifically is: delivering measurement configuration information to the UE to instruct the UE to read a broadcast message of the unknown neighboring cell.

Still further, a timer is set simultaneously when the measurement configuration information is delivered to the UE. The timer is adapted to measure the period of time during which the uplink resource allocation and the downlink resource allocation of the UE are limited simultaneously.

S23: Receive the broadcast message of the unknown neighboring cell read by the UE.

S24: Cancel the scheduling synchronization of the uplink resources and the downlink resources of the UE.

Still further, when the UE successfully reads and reports the broadcast message of the unknown neighboring cell during the period of time set by the timer, the network side device cancels the scheduling synchronization of the uplink resources and the downlink resources of the UE; or, when the period of time set by the timer expires, the network side device cancels the scheduling synchronization of the uplink resources and the downlink resources of the UE.

In the method for reading a broadcast message according to this embodiment, a scheduling synchronization negotiation is performed with respect to the uplink resources and the downlink resources of the UE to simultaneously limit the uplink resource allocation and the downlink resource allocation of the UE in a period of time, so that the UE is not interrupted by the uplink and downlink resources as far as possible when reading the broadcast message of an unknown neighboring cell, thereby having more free time to read a system broadcast message. Moreover, the uplink scheduling unit and the downlink scheduling unit can adjust a scheduling policy according to the service type of the UE. Therefore, the UE is enabled to quickly read the broadcast message (such as a GCI) of the unknown neighboring cell.

The following describes how a period of time during which the uplink resource allocation and the downlink resource allocation of the UE are simultaneously limited is determined according to the maximum time interval at which the UE receives the uplink data, the maximum time interval at which the UE receives the downlink data, the moment when the uplink scheduling starts, and the moment when the downlink scheduling starts.

The description is based on the following assumptions: the maximum time interval at which the UE receives the uplink data is T1; the moment when the uplink scheduling starts is A1; the maximum time interval at which the UE receives the downlink data is T2; and the moment when the downlink scheduling starts is A2. First, T1, T2, A1, and A2 satisfy: A1=A2, or A1 is later than A2 and A2 is located between A1 and A1+T1, or A2 is later than A1 and A1 is located between A2 and A2+T2. Provided that the conditions are met, the period of time is:

if A1=A2 and T1=T2, the moment when the scheduling synchronization starts is A1, and the period of time is T1; and if A1 is later than A2 and T1=T2, the moment when the scheduling synchronization starts may be A1 or A2, and the period of time is T1 or A2−A1+T1.

Definitely, other combinations of A1, A2, T1, and T2 are also acceptable.

Embodiment 3

Figure 5:
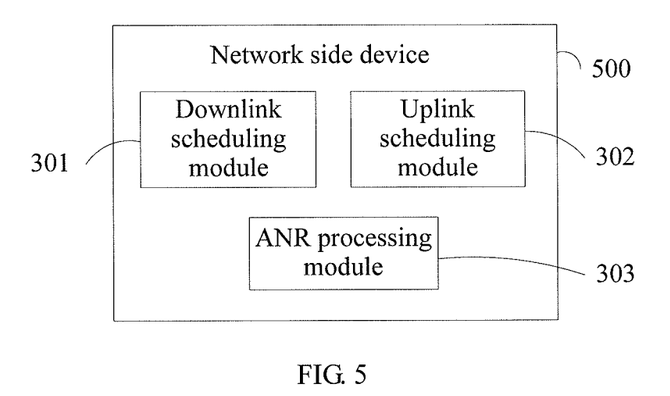
FIG. 5 is a schematic structure diagram of a network side device according to Embodiment 3 of the present invention.

This embodiment provides a network side device 500. As shown in FIG. 5, the network side device 500 includes: a downlink scheduling unit 301, an uplink scheduling unit 302, and an ANR processing unit 303.

The downlink scheduling unit 301 is adapted to schedule downlink resources of a UE. The uplink scheduling unit 302 is adapted to schedule uplink resources of the UE. The ANR processing unit 303 is adapted to receive measurement information (such as PCI information) reported by the UE, determine, according to the measurement information, whether the UE discovers an unknown neighboring cell, and if the UE discovers an unknown neighboring cell, send a scheduling synchronization request message to the downlink scheduling unit 301 and/or the uplink scheduling unit 302, and after the uplink scheduling unit 302 and the downlink scheduling unit 301 perform a scheduling synchronization negotiation for the uplink resources and the downlink resources of the UE and reach an agreement, deliver measurement configuration information to the UE to instruct the UE to read a broadcast message of the unknown neighboring cell, so as to obtain other parameters (such as PLMN Id, GCI, TAC, or RAC) of the unknown neighboring cell corresponding to the PCI and create a neighbor according to the result reported by the UE.

The network side device in this embodiment is an evolved Node B (eNB) or an RNC.

Figure 6:
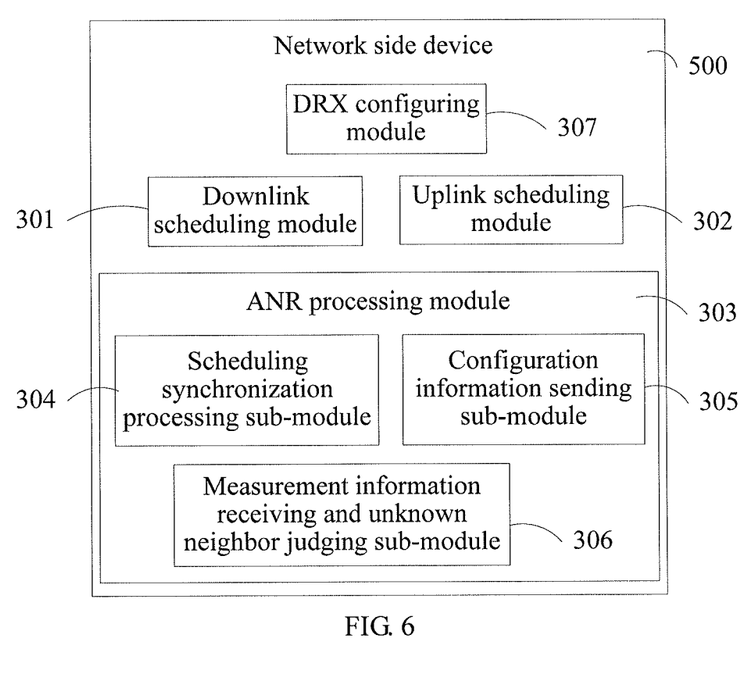
FIG. 6 is a schematic structure diagram of a network side device according to Embodiment 3 of the present invention.

Optionally, as shown in FIG. 6, the ANR processing unit 303 in the network side device 500 may further include: a measurement information receiving and unknown neighboring cell judging sub-unit 306, a scheduling synchronization processing sub-unit 304, and a configuration information sending sub-unit 305. The measurement information receiving and unknown neighboring cell judging sub-unit 306 is adapted to receive measurement information reported by a UE and according to the measurement information, judge whether the UE discovers an unknown neighboring cell. The scheduling synchronization processing sub-unit 304 is adapted to send a scheduling synchronization request message to the downlink scheduling unit 301 and/or the uplink scheduling unit 302, receive a negotiation result fed back by the downlink scheduling unit 301 and the uplink scheduling unit 302, and according to the negotiation result, determine a period of time during which uplink resource allocation and downlink resource allocation of the UE are simultaneously limited and a moment when the scheduling synchronization starts. The configuration information sending sub-unit 305 is adapted to send measurement configuration information to the UE to instruct the UE to read a broadcast message of the unknown neighboring cell.

Further, as shown in FIG. 6, the network side device may further include: a DRX configuring unit 307, adapted to configure DRX.

Figure 7:
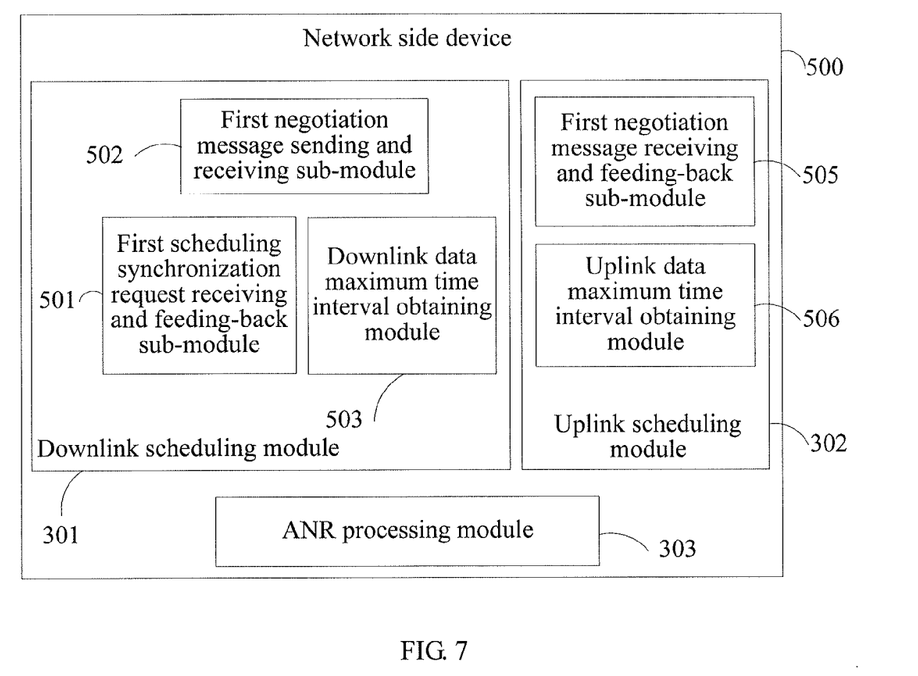
FIG. 7 is a schematic structure diagram of a network side device according to Embodiment 3 of the present invention.

Optionally, as shown in FIG. 7, the downlink scheduling unit 301 in the network side device 500 may include: a downlink data maximum time interval obtaining unit 503, a first negotiation message sending and receiving sub-unit 502, and a first scheduling synchronization request receiving and feeding-back sub-unit 501.

The downlink data maximum time interval obtaining unit 503 is adapted to obtain, according to the class of service of the UE and the length of the DRX cycle, a maximum time interval at which the UE receives downlink data and a moment when downlink scheduling starts. The first negotiation message sending and receiving sub-unit 502 is adapted to send a scheduling synchronization negotiation message to the uplink scheduling unit 302, and receive a maximum time interval at which the UE receives uplink data and a moment when uplink scheduling starts which are sent by the uplink scheduling unit 302. The first scheduling synchronization request receiving and feeding-back sub-unit 501 is adapted to receive the scheduling synchronization request message sent by the scheduling synchronization processing sub-unit 304, and feed back the maximum time interval at which the UE receives the downlink data, the maximum time interval at which the UE receives the uplink data, the moment when the downlink scheduling starts, and the moment when the uplink scheduling starts to the scheduling synchronization processing sub-unit 304.

Accordingly, the uplink scheduling unit 302 in the network side device 500 may include: an uplink data maximum time interval obtaining unit 506 and a first negotiation message receiving and feeding-back sub-unit 505. The uplink data maximum time interval obtaining unit 506 is adapted to obtain, according to the class of service of the UE and the length of the DRX cycle, the maximum time interval at which the UE receives the uplink data and the moment when the uplink scheduling starts. The first negotiation message receiving and feeding-back sub-unit 505 is adapted to receive the scheduling synchronization negotiation message sent by the first negotiation message sending and receiving sub-unit 502 and send the maximum time interval at which the UE receives the uplink data and the moment when the uplink scheduling starts to the first negotiation message sending and receiving sub-unit 502. The moment when the uplink scheduling starts and the moment when the downlink scheduling starts are the same or as same as possible.

Figure 8:
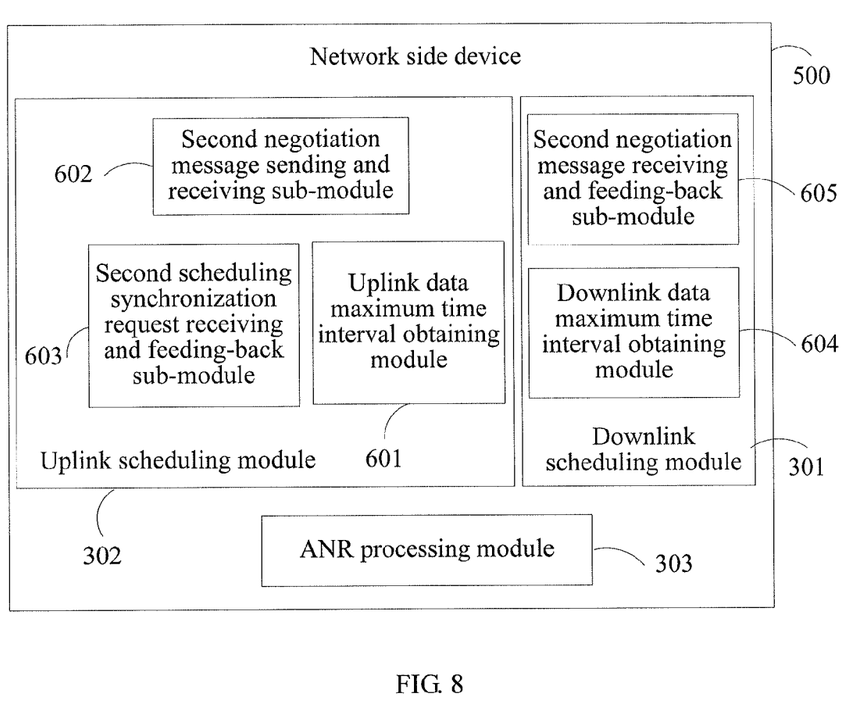
FIG. 8 is a schematic structure diagram of a network side device according to Embodiment 3 of the present invention.

Optionally, as shown in FIG. 8, the uplink scheduling unit 302 in the network side device 500 according to this embodiment may also include: an uplink data maximum time interval obtaining unit 601, a second negotiation message sending and receiving sub-unit 602, and a second scheduling synchronization request receiving and feeding-back sub-unit 603.

The uplink data maximum time interval obtaining unit 601 is adapted to obtain, according to the class of service of the UE and the length of the DRX cycle, the maximum time interval at which the UE receives the uplink data and the moment when the uplink scheduling starts. The second negotiation message sending and receiving sub-unit 602 is adapted to send a scheduling synchronization negotiation message to the downlink scheduling unit 301, and receive the maximum time interval at which the UE receives the downlink data and the moment when the downlink scheduling starts which are sent by the downlink scheduling unit 301. The second scheduling synchronization request receiving and feeding-back sub-unit 603 is adapted to receive the scheduling synchronization request message sent by the scheduling synchronization processing sub-unit 304, and feed back the maximum time interval at which the UE receives the downlink data, the maximum time interval at which the UE receives the uplink data, the moment when the downlink scheduling starts, and the moment when the uplink scheduling starts to the scheduling synchronization processing sub-unit 304.

Accordingly, the downlink scheduling unit 301 in the network side device 500 includes: a downlink data maximum time interval obtaining unit 604 and a second negotiation message receiving and feeding-back sub-unit 605.

The downlink data maximum time interval obtaining unit 604 is adapted to obtain, according to the class of service of the UE and the length of the DRX cycle, the maximum time interval at which the UE receives the downlink data and the moment when the downlink scheduling starts. The second negotiation message receiving and feeding-back sub-unit 605 is adapted to receive the scheduling synchronization negotiation message sent by the second negotiation message sending and receiving sub-unit 602 and send the maximum time interval at which the UE receives the downlink data and the moment when the downlink scheduling starts to the second negotiation message sending and receiving sub-unit 602. The moment when the uplink scheduling starts and the moment when the downlink scheduling starts are the same or as same as possible.

Figure 9:
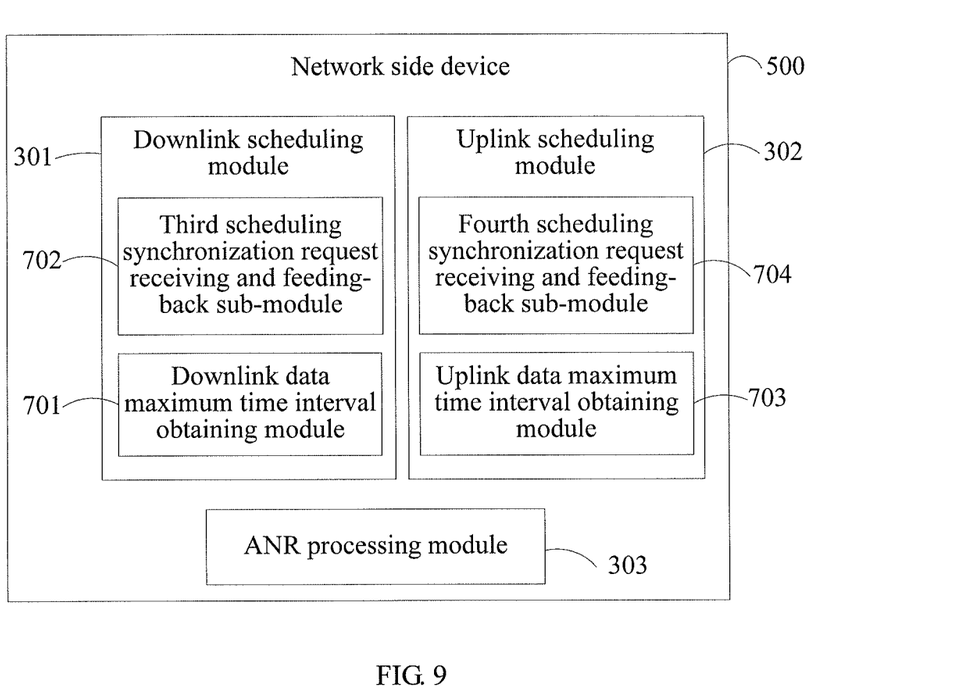
FIG. 9 is a schematic structure diagram of network side device according to Embodiment 3 of the present invention.

Optionally, as shown in FIG. 9, the downlink scheduling unit 301 of the network side device 500 according to this embodiment may also include: a downlink data maximum time interval obtaining unit 701 and a third scheduling synchronization request receiving and feeding-back sub-unit 702.

The downlink data maximum time interval obtaining unit 701 is adapted to obtain, according to the class of service of the UE and the length of the DRX cycle, the maximum time interval at which the UE receives the downlink data and the moment when the downlink scheduling starts. The third scheduling synchronization request receiving and feeding-back sub-unit 702 is adapted to receive the scheduling synchronization request message sent by the scheduling synchronization processing sub-unit 304, and feed back the maximum time interval at which the UE receives the downlink data and the moment when the downlink scheduling starts to the scheduling synchronization processing sub-unit 304.

Accordingly, the uplink scheduling unit 302 in the network side device 500 includes: an uplink data maximum time interval obtaining unit 703 and a fourth scheduling synchronization request receiving and feeding-back sub-unit 704.

The uplink data maximum time interval obtaining unit 703 is adapted to obtain, according to the class of service of the UE and the length of the DRX cycle, the maximum time interval at which the UE receives the uplink data and the moment when the uplink scheduling starts. The fourth scheduling synchronization request receiving and feeding-back sub-unit 704 is adapted to receive the scheduling synchronization request message sent by the scheduling synchronization processing sub-unit 304, and feed back the maximum time interval at which the UE receives the uplink data and the moment when the uplink scheduling starts to the scheduling synchronization processing sub-unit 304. The moment when the uplink scheduling starts and the moment when the downlink scheduling starts are the same or as same as possible.

In the network side device 500 according to this embodiment, in addition to the ANR processing unit 303, the uplink scheduling unit 302 or the downlink scheduling unit 301 may also determine, according to the maximum time interval at which the UE receives the downlink data, the maximum time interval at which the UE receives the uplink data, the moment when the downlink scheduling starts, and the moment when the uplink scheduling starts, the period of time during which the uplink resource allocation and the downlink resource allocation of the UE are limited simultaneously.

The network side device according to this embodiment can perform a scheduling synchronization negotiation for the uplink resources and the downlink resources of the UE to simultaneously limit the uplink resource allocation and the downlink resource allocation of the UE during a period of time, so that the UE is not interrupted by the uplink and downlink resources as far as possible when reading the broadcast message of an unknown neighboring cell, thus having more free time to read a system broadcast message. Therefore, the UE is enabled to quickly read the broadcast message of the unknown neighboring cell.

Embodiment 4

Figure 10:
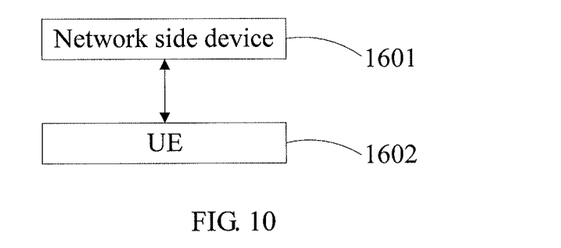
FIG. 10 is a schematic structure diagram of a system for reading a broadcast message according to Embodiment 4 of the present invention.

As shown in FIG. 10, this embodiment provides a system for reading a broadcast message, where the system includes: a UE 1602 and a network side device 1602 according to Embodiment 3 (that is, the network side device 500 in Embodiment 3). The UE 1602 is adapted to report measurement information to the network side device 1601 and according to an instruction of the network side device 1601, read a broadcast message of an unknown neighboring cell. The network side device 1601 is an eNB or an RNC.

Figure 11:
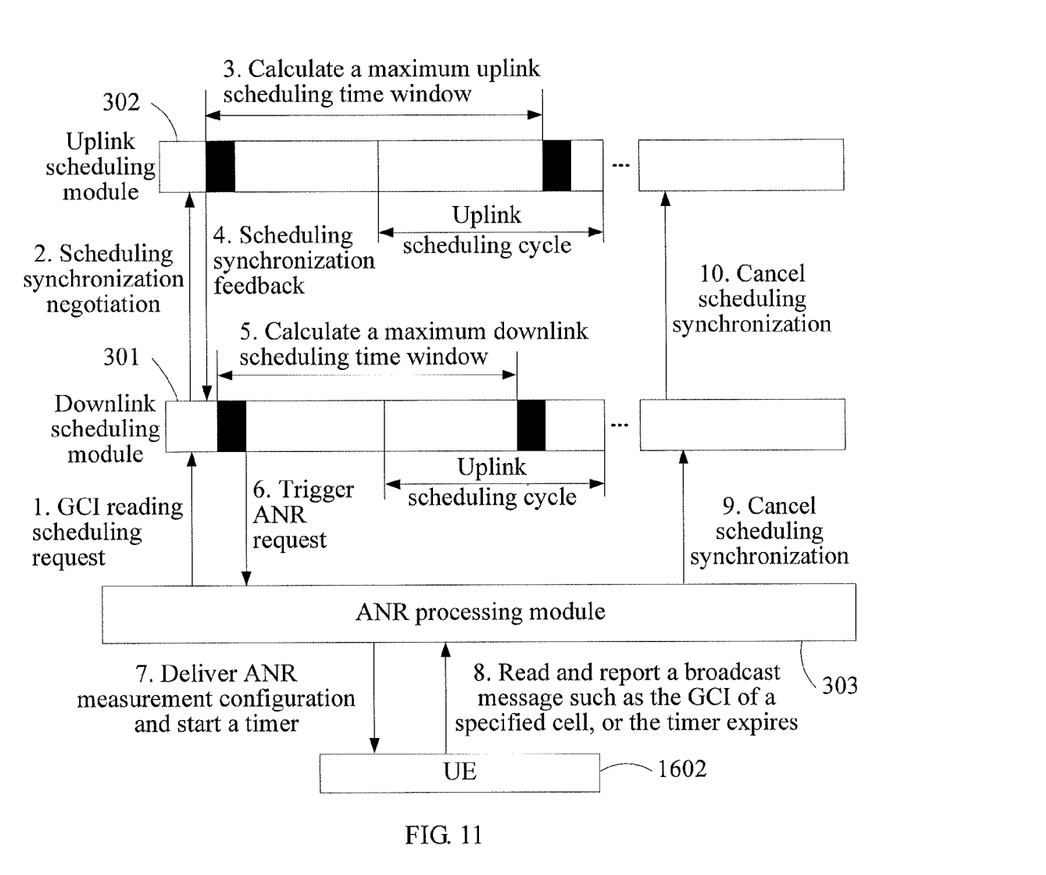
FIG. 11 is a workflow diagram of the system for reading a broadcast message according to Embodiment 4 of the present invention.

The workflow of the system for reading a broadcast message according to this embodiment is described below by taking the situation that the network side device 1601 is an eNB as an example, where a structure of the network side device 1601, as shown in FIG. 5, includes a downlink scheduling unit 301, an uplink scheduling unit 302, and an ANR processing unit 303. As shown in FIG. 11, the specific flow is as follows.

1. The UE 1602 reports a measurement report which carries a PCI of an unknown neighboring cell, and at this time, the eNB considers that the UE discovers an unknown neighboring cell, and the ANR processing unit 303 sends a "scheduling synchronization request" message to the downlink scheduling unit 301.

2. The downlink scheduling unit 301 sends a "scheduling synchronization negotiation" message to the uplink scheduling unit 302 to inquire about whether the uplink scheduling unit 302 can accept the scheduling request.

3. According to the request message of the downlink scheduling unit 301, a service type of the UE 1602, and a length of a DRX cycle, the uplink scheduling unit 302 calculates a minimum scheduling data volume that the UE 1602 can tolerate, so as to expand a time interval at which the UE receives uplink data (that is, a maximum uplink scheduling time window) and obtain a moment when uplink scheduling starts.

4. The uplink scheduling unit 302 feeds back a "scheduling synchronization feedback" message to the downlink scheduling unit 301 to indicate that the unit accepts the request of the downlink scheduling unit 301.

5. According to the service type of the UE 1602 and the length of the DRX cycle, the downlink scheduling unit 301 calculates the minimum scheduling data volume that the UE 1602 can tolerate, to expand a time interval at which the UE 1602 receives downlink data (that is, the maximum downlink scheduling time window) and obtain a moment when downlink scheduling starts in synchronization with the moment when the uplink scheduling starts.

6. After reaching an agreement through the negotiation, the uplink scheduling unit 302 and the downlink scheduling unit 301 determine a period of time during which uplink resource allocation and downlink resource allocation of the UE 1602 are limited simultaneously and a moment when scheduling synchronization starts, and send a "trigger ANR request" message to the ANR processing unit 303 of the eNB. The simultaneously limiting the uplink resource allocation and the downlink resource allocation of the UE 1602 specifically is: performing no uplink or downlink scheduling for the UE 1602, or provided that the QoS of the UE is met, allocating fewer uplink and downlink resources to the UE 1602, thereby enabling the UE 1602 to have sufficient time (DRX sleep period) to read a system broadcast message (such as PLMN Id, CGI, TAC or RAC) of an unknown neighboring cell.

7. The ANR processing unit 303 delivers measurement configuration to the UE 1602 to instruct the UE 1602 to read such information as CGI corresponding to the PCI, and sets a timer which is adapted to measure the period of time during which the uplink resource allocation and the downlink resource allocation of the UE 1602 are limited simultaneously.

8. The UE 1602 successfully reads and reports such information as GCI within a specified period of time, or the timer in step 7 expires, which triggers the ANR processing unit 303 to cancel a scheduling policy adjustment.

9. The ANR processing unit 303 sends a "cancel scheduling synchronization" message to the downlink scheduling unit 301.

10. The downlink scheduling unit 301 sends a "cancel scheduling synchronization" message to the uplink scheduling unit 302, so as to restore normal scheduling of the UE 1602 to ensure the QoS of the UE 1602.

In the workflow, the situation that the downlink scheduling unit 301 sends a request to the uplink scheduling unit 302 to perform a scheduling synchronization negotiation is taken as an example, but the negotiation process is not limited thereto. The negotiation process may also be that the downlink scheduling unit 301 first obtains the time interval at which the UE 1602 receives the downlink data and the moment when the downlink scheduling starts and then sends the result to the uplink scheduling unit 302 to perform a negotiation. Moreover, the embodiment of the present invention is not limited to the situation that the downlink scheduling unit 301 sends a negotiation message to the uplink scheduling unit 302, and the situation may also be that the uplink scheduling unit 302 sends a request to the downlink scheduling unit 301 to perform a scheduling synchronization negotiation, or the ANR processing unit 303 sends a "scheduling synchronization request" message to the downlink scheduling unit 301 and the uplink scheduling unit 302 simultaneously to perform a scheduling synchronization negotiation.

By adopting the system for reading a broadcast message, the network side device 1601 can perform a scheduling synchronization negotiation for the uplink resources and the downlink resources of the UE 1602 to simultaneously limit the uplink resource allocation and downlink resource allocation of the UE 1602 during a period of time, so that the UE 1602 is not interrupted by the uplink and downlink resources as far as possible when reading the broadcast message of an unknown neighboring cell, thereby having more free time to read a system broadcast message. Therefore, the UE 1602 is enabled to quickly read the broadcast message of the unknown neighboring cell.

Persons of ordinary skill in the art may understand that all or part of the processes of the methods according to the embodiments of the present invention may be implemented by a program instructing relevant hardware. The computer program may be stored in a computer readable storage medium. When the program is run, the processes of the methods according to the embodiments of the present invention are performed. The storage medium may be a magnetic disk, an optical disk, a read only memory (ROM), a random access memory (RAM), and so on.

The above descriptions are merely several embodiments of the present invention, but not intended to limit the present invention. Various variations and modifications made by persons skilled in the art without departing from the spirit of the present invention shall fall within the protection scope of the present invention. Therefore, the protection scope of the present invention is subject to the appended claims.

What is claimed is:

1. A method for reading a broadcast message, comprising:
receiving, by a network side device, a measurement information reported by a user equipment (UE);
performing a scheduling synchronization negotiation for an uplink resource and a downlink resource of the UE when, according to the measurement information, it has been determined that the UE discovered a neighboring cell;
instructing the UE to read a broadcast message of the neighboring cell after a synchronization agreement from the scheduling synchronization negotiation has been reached; and
wherein the scheduling synchronization negotiation reaches a synchronization agreement, which comprises:
determining, by the network side device, a period of time during which uplink resource allocation and downlink resource allocation of the UE are limited simultaneously.

2. The method for reading a broadcast message according to claim 1, wherein when a downlink scheduling unit receives a scheduling synchronization request message, the performing comprises:
sending, by the downlink scheduling unit, a scheduling synchronization negotiation message to an uplink scheduling unit;
obtaining, by the uplink scheduling unit, a maximum time interval at which the UE receives uplink data and a moment when uplink scheduling starts, and feeding back the maximum time interval at which the UE receives the uplink data and the moment when the uplink scheduling starts to the downlink scheduling unit;
obtaining, by the downlink scheduling unit, a maximum time interval at which the UE receives downlink data and a moment when downlink scheduling starts in synchronization with the moment when the uplink scheduling starts; and
according to the maximum time interval at which the UE receives the uplink data, the maximum time interval at which the UE receives the downlink data, the moment when the uplink scheduling starts, and the moment when the downlink scheduling starts, determining, by the network side device, a period of time during which uplink resource allocation and downlink resource allocation of the UE are limited simultaneously;
or comprises:
obtaining, by the downlink scheduling unit, a maximum time interval at which the UE receives downlink data and the moment when downlink scheduling starts, and sending the maximum time interval at which the UE receives the downlink data and the moment when the downlink scheduling starts to an uplink scheduling unit to perform a scheduling synchronization negotiation;
obtaining, by the uplink scheduling unit, a maximum time interval at which the UE receives uplink data and a moment when uplink scheduling starts in synchronization with the moment when the downlink scheduling starts; and
according to the maximum time interval at which the UE receives the uplink data, the maximum time interval at which the UE receives the downlink data, the moment when the uplink scheduling starts, and the moment when the downlink scheduling starts, determining, by the network side device, the period of time during which the uplink resource allocation and the downlink resource allocation of the UE are limited simultaneously.

3. The method for reading a broadcast message according to claim 1, wherein when an uplink scheduling unit receives a scheduling synchronization request message, the performing comprises:

sending, by the uplink scheduling unit, a scheduling synchronization negotiation message to a downlink scheduling unit;

obtaining, by the downlink scheduling unit, a maximum time interval at which the UE receives downlink data and a moment when downlink scheduling starts, and feeding back the maximum time interval at which the UE receives the downlink data and the moment when the downlink scheduling starts to the uplink scheduling unit;

obtaining, by the uplink scheduling unit, a maximum time interval at which the UE receives uplink data and a moment when uplink scheduling starts in synchronization with the moment when the downlink scheduling starts; and according to the maximum time interval at which the UE receives the uplink data, the maximum time interval at which the UE receives the downlink data, the moment when the uplink scheduling starts, and the moment when the downlink scheduling starts, determining, by the network side device, a period of time during which uplink resource allocation and downlink resource allocation of the UE are limited simultaneously;

or comprises:

obtaining, by the uplink scheduling unit, a maximum time interval at which the UE receives uplink data and a moment when uplink scheduling starts, and sending the maximum time interval at which the UE receives the uplink data and the moment when the uplink scheduling starts to a downlink scheduling unit to perform the scheduling synchronization negotiation;

obtaining, by the downlink scheduling unit, a maximum time interval at which the UE receives downlink data and a moment when downlink scheduling starts in synchronization with the moment when the uplink scheduling starts; and according to the maximum time interval at which the UE receives the uplink data, the maximum time interval at which the UE receives the downlink data, the moment when the uplink scheduling starts, and the moment when the downlink scheduling starts, determining, by the network side device, the period of time during which the uplink resource allocation and the downlink resource allocation of the UE are limited simultaneously.

4. The method for reading a broadcast message according to claim 3, wherein the obtaining, by the downlink scheduling unit, the maximum time interval at which the UE receives the downlink data and the moment when the downlink scheduling starts specifically comprises:

according to a service type of the UE and a length of a discontinuous reception (DRX) cycle, obtaining, by the downlink scheduling unit, the maximum time interval at which the UE receives the downlink data and the moment when the downlink scheduling starts.

5. The method for reading a broadcast message according to claim 3, wherein the obtaining, by the uplink scheduling unit, the maximum time interval at which the UE receives the uplink data and the moment when the uplink scheduling starts specifically comprises:

according to a service type of the UE and a length of a discontinuous reception (DRX) cycle, obtaining, by the uplink scheduling unit, the maximum time interval at which the UE receives the uplink data and the moment when the uplink scheduling starts.

6. The method for reading a broadcast message according to claim 3, wherein the simultaneously limiting the uplink resource allocation and the downlink resource allocation of the UE specifically comprises: stopping allocating uplink resources and downlink resources to the UE during the period of time; or allocating fewer uplink resources and downlink resources to the UE during the period of time.

7. The method for reading a broadcast message according to claim 1, wherein when an uplink scheduling unit and a downlink scheduling unit receive a scheduling synchronization request message, the performing comprises:

obtaining, by the uplink scheduling unit, a maximum time interval at which the UE receives uplink data and a moment when uplink scheduling starts;

obtaining, by the downlink scheduling unit, a maximum time interval at which the UE receives downlink data and a moment when downlink scheduling starts; and according to the maximum time interval at which the UE receives the downlink data, the maximum time interval at which the UE receives the uplink data, the moment when the uplink scheduling starts, and the moment when the downlink scheduling starts, determining, by the network side device, the moment when the uplink scheduling starts and the moment when the downlink scheduling starts which are synchronous and a period of time during which uplink resource allocation and downlink resource allocation of the UE are limited simultaneously.

8. The method for reading a broadcast message according to claim 1, further comprising:

receiving, by an uplink scheduling unit and/or a downlink scheduling unit of the network side device, a scheduling synchronization request message.

9. The method for reading a broadcast message according to claim 1, wherein the instructing the UE to read the broadcast message of the neighboring cell specifically comprises: delivering a measurement configuration information to the UE to instruct the UE to read the broadcast message of the neighboring cell.

10. The method for reading a broadcast message according to claim 9, wherein a timer is set simultaneously when the measurement configuration information is delivered to the UE.

11. The method for reading a broadcast message according to claim 10, wherein in a period of time set by the timer, when the UE successfully reads and reports the broadcast message of the neighboring cell, the network side device cancels the scheduling synchronization of the uplink resources and the downlink resources of the UE; or when the period of time set by the timer expires, the network side device cancels the scheduling synchronization of the uplink resources and the downlink resources of the UE.

12. The method for reading a broadcast message according to claim 1, wherein after the instructing the UE to read the broadcast message of the neighboring cell, the method further comprises:

receiving the broadcast message of the neighboring cell read by the UE; and canceling the scheduling synchronization of the uplink resources and the downlink resources of the UE.

13. A network side device, comprising:

a downlink scheduling unit, configured to schedule a downlink resource of a user equipment (UE);

an uplink scheduling unit, configured to schedule an uplink resource of the UE; and an automatic neighbor relation (ANR) processing unit, configured to receive a measurement information reported by the UE, to determine whether the UE discovers a neighboring cell according to the measurement information, to send a scheduling synchronization request message to the uplink scheduling unit and/or the downlink scheduling unit if the UE discovers the neighboring cell, and to deliver a measurement configuration information to the UE to instruct the UE to read a broadcast message of the neighboring cell after the uplink scheduling unit and/or the downlink scheduling unit perform a scheduling synchronization agreement during which the uplink resource allocation and the downlink resource allocation of the UE are limited simultaneously.

14. The network side device according to claim 13, wherein the ANR processing unit comprises:
    a measurement information receiving and neighboring cell judging sub-unit, configured to receive the measurement information reported by the UE and according to the measurement information, judge whether the UE discovers a neighboring cell;
    a scheduling synchronization processing sub-unit, configured to send a scheduling synchronization request message to the downlink scheduling unit and/or the uplink scheduling unit, receive a negotiation result fed back by the downlink scheduling unit and the uplink scheduling unit, and according to the negotiation result, determine a period of time during which uplink resource allocation and downlink resource allocation of the UE are limited simultaneously and a moment when scheduling synchronization starts; and
    a configuration information sending sub-unit, configured to send measurement configuration information to the UE to instruct the UE to read the broadcast message of the neighboring cell.

15. The network side device according to claim 14, wherein the downlink scheduling unit comprises:
    a downlink data maximum time interval obtaining unit, configured to obtain a maximum time interval at which the UE receives downlink data and a moment when downlink scheduling starts;
    a first negotiation message sending and receiving sub-unit, configured to send a scheduling synchronization negotiation message to the uplink scheduling unit, and receive a maximum time interval at which the UE receives uplink data and a moment when uplink scheduling starts which are sent by the uplink scheduling unit; and
    a first scheduling synchronization request receiving and feeding-back sub-unit, configured to receive the scheduling synchronization request message sent by the scheduling synchronization processing sub-unit, and feed back the maximum time interval at which the UE receives the downlink data, the maximum time interval at which the UE receives the uplink data, the moment when the downlink scheduling starts, and the moment when the uplink scheduling starts to the scheduling synchronization processing sub-unit; and
    the uplink scheduling unit comprises:
    an uplink data maximum time interval obtaining unit, configured to obtain the maximum time interval at which the UE receives the uplink data and the moment when the uplink scheduling starts; and
    a first negotiation message receiving and feeding-back sub-unit, configured to receive the scheduling synchronization negotiation message sent by the first negotiation message sending and receiving sub-unit, and send the maximum time interval at which the UE receives the uplink data and the moment when the uplink scheduling starts to the first negotiation message sending and receiving sub-unit.

16. The network side device according to claim 14, wherein the uplink scheduling unit comprises:
    an uplink data maximum time interval obtaining unit, configured to obtain a maximum time interval at which the UE receives uplink data and a moment when uplink scheduling starts;
    a second negotiation message sending and receiving sub-unit, configured to send a scheduling synchronization negotiation message to the downlink scheduling unit, and receive a maximum time interval at which the UE receives downlink data and a moment when downlink scheduling starts which are sent by the downlink scheduling unit; and
    a second scheduling synchronization request receiving and feeding-back sub-unit, configured to receive the scheduling synchronization request message sent by the scheduling synchronization processing sub-unit, and feed back the maximum time interval at which the UE receives the downlink data, the maximum time interval at which the UE receives the uplink data, the moment when the downlink scheduling starts, and the moment when the uplink scheduling starts to the scheduling synchronization processing sub-unit; and
    the downlink scheduling unit comprises:
    a downlink data maximum time interval obtaining unit, configured to obtain the maximum time interval at which the UE receives the downlink data and the moment when the downlink scheduling starts; and
    a second negotiation message receiving and feeding-back sub-unit, configured to receive the scheduling synchronization negotiation message sent by the second negotiation message sending and receiving sub-unit, and send the maximum time interval at which the UE receives the downlink data and the moment when the downlink scheduling starts to the second negotiation message sending and receiving sub-unit.

17. The network side device according to claim 14, wherein the downlink scheduling unit comprises:
    a downlink data maximum time interval obtaining unit, configured to obtain a maximum time interval at which the UE receives downlink data and a moment when downlink scheduling starts; and
    a third scheduling synchronization request receiving and feeding-back sub-unit, configured to receive the scheduling synchronization request message sent by the scheduling synchronization processing sub-unit, and feed back the maximum time interval at which the UE receives the downlink data and the moment when the downlink scheduling starts to the scheduling synchronization processing sub-unit; and
    the uplink scheduling unit comprises:
    an uplink data maximum time interval obtaining unit, configured to obtain a maximum time interval at which the UE receives uplink data and a moment when uplink scheduling starts; and
    a fourth scheduling synchronization request receiving and feeding-back sub-unit, configured to receive the scheduling synchronization request message sent by the scheduling synchronization processing sub-unit, and feed back the maximum time interval at which the UE receives the uplink data and the moment when the uplink scheduling starts to the scheduling synchronization processing sub-unit.

* * * * *